United States Patent [19]

Raden et al.

[11] 4,293,658

[45] Oct. 6, 1981

[54] PROCESS FOR RIGID FOAMS OF IMPROVED FRIABILITY

[75] Inventors: Daniel S. Raden, Hawthorn Woods; Francis W. Arbir, Itasca, both of Ill.

[73] Assignee: Abbott Laboratories, North Chicago, Ill.

[21] Appl. No.: 148,634

[22] Filed: May 12, 1980

[51] Int. Cl.$^3$ ............... C08G 18/14; C08G 18/18; C08G 18/24; C08G 18/32
[52] U.S. Cl. ............... 521/129; 252/438; 521/130; 521/170
[58] Field of Search ............... 521/129, 170; 252/438

[56] References Cited

U.S. PATENT DOCUMENTS

| | | | |
|---|---|---|---|
| 3,485,797 | 12/1969 | Robins | 260/17.2 |
| 3,632,531 | 1/1972 | Rush et al. | 521/170 |
| 3,769,244 | 10/1973 | Hashimoto et al. | 521/129 |
| 3,872,034 | 3/1975 | Dickert | 521/170 |
| 3,948,824 | 4/1976 | Robins | 260/2.5 F |
| 4,165,412 | 8/1979 | Bechara et al. | 521/129 |
| 4,169,922 | 10/1979 | Brown et al. | 521/155 |
| 4,196,268 | 4/1980 | Brown et al. | 521/130 |

FOREIGN PATENT DOCUMENTS

| | | | |
|---|---|---|---|
| 732648 | 4/1966 | Canada | 521/129 |
| 794051 | 4/1958 | United Kingdom | 521/129 |

OTHER PUBLICATIONS

Rochester–Acidity Functions, Academic Press (N.Y.) 1970, pp. 52–65.
Gmitter et al., S.P.E. Journal, vol. 15, No. 11, Nov. 1959, pp. 957–960.

*Primary Examiner*—H. S. Cockeram
*Attorney, Agent, or Firm*—Paul D. Burgauer; Robert L. Niblack

[57] ABSTRACT

Polyurethanes based on a resole-type polyol can be significantly improved in their friability when the urethane catalyst is a fully neutralized tertiary amine salt and butyl benzyl phthalate is used as the plasticizer.

The polyol is prepared by reacting a phenol and formaldehyde under substantially anhydrous conditions with continuous removal of water, and has a water content of no more than about 5%.

21 Claims, No Drawings

PROCESS FOR RIGID FOAMS OF IMPROVED FRIABILITY

DETAILED DESCRIPTION OF THE INVENTION

Polyurethanes using a wide variety of polyisocyanates, polyols or polyetherpolyols have been proposed and made for a great variety of end uses. Depending on the selection of the isocyanate component or the hydroxy group component, various properties can be instilled into the end product, i.e., rigid, flexible, or semi-flexible foams with small, large or no cells can be obtained.

Several years ago, a new type of polyol known as a resole became known. It is described in U.S. Pat. No. 3,485,797 and is essentially a condensation product between an optionally substituted phenol and an aliphatic aldehyde wherein the aliphatic hydrocarbon chain contains between 0 and 8 carbons. U.S. Pat. No. 3,948,824 describes a method for using the referenced polyol for the manufacture of a cellular polyurethane with increased thermal stability which, if properly treated, will withstand prolonged exposure to elevated temperatures without undue loss of strength, distortion, melting or decomposition. The cellular structure of U.S. Pat. No. 3,948,824, however, requires a heating step subsequent to the foam formation in order to produce good thermal stability, and the product suffers from low friability.

Both of the named disadvantages can be overcome by the current new process for making a rigid, cellular polyurethane which consists essentially in reacting a polyisocyanate with a polyol in the presence of tertiary amine salt, a surfactant, a blowing agent, and at least a minor proportion of butyl benzyl phthalate, said polyol being prepared by reacting a phenol and formaldehyde under substantially anhydrous conditions with continuous removal of water and said polyol having a water content of no more than 5% and having at least four phenyl groups per mole. As mentioned above, the polyols used for practicing this invention are those defined and described in U.S. Pat. No. 3,485,797; the polyisocyanates are enumerated in U.S. Pat. No. 3,948,824 and many other well-known texts; surfactants and blowing agents are also well known and in part described in U.S. Pat. No. 3,948,824. For best performance, one uses between 0.95 and 1.25 molar equivalents of a polyisocyanate per molar equivalent of a polyol and, based on the weight of said polyol, 0.5 to 5.0% of butyl benzyl phthalate, 0.5 to 4.0% of a surfactant, 0.4 to 40% of a blowing agent, together with 0.001 to 0.05 molar equivalents of a tertiary amine salt.

The novelty of the current process is primarily based on the use of butyl benzyl phthalate as the plasticizer and the employment of fully neutralized salts of a tertiary or poly-tertiary amine as the catalyst for the polyurethane formation. The term "fully neutralized" is intended to denote that any tertiary amine salt of the amine catalyst is fully satisfied with an acid to form the salt, i.e., a di-tertiary amine catalyst will need two equivalents of an acid to fulfill the above requirement.

The present invention also includes the further improvement attainable by using a tin catalyst in addition to the above ingredients. While such well known tin catalyst are not a requirement for producing the rigid, cellular polyurethanes of improved friability and firmer stability of the present invention, their addition frequently improves the physical properties of the ultimate foam. When using any of the well-known class of tin catalysts, a preferred amount is between $1.5 \times 10^{-4}$ and $1.6 - 10^{-3}$ mole percent based on the polyol used, dependent on the molecular weight of said polyol.

While the use of tertiary amines and the use of certain phthalates have been known in the polyurethane industry, the use of the combination of these materials in connection with resoles led to totally unexpected results in improved friability, as will be demonstrated below. When either the butyl benzyl phthalate is omitted or the tertiary amine is used without its full acid complement to form the proper neutral salt, standard tests will clearly show the deficiency of the end product concerning surface damage. Thus, friability can be improved by the novel combination of ingredients, regardless of the type of tertiary amine that is used in its salt form, provided that said amine is used as a fully neutralized salt. The tertiary amine may have a single tertiary amino group as in a trialkyl amine, it may be a di-tertiary amine such as tetramethylpropylene diamine, a tetratertiary amine such as tris(dimethylaminopropyl)amine, etc. and, of course, the tertiary amine can be cyclic or contain cyclic portions such as in 1,5-diaza-bicyclo[5.4.0]undec-5-ene (hereinafter referred to as DBU) or dicyclohexylmethylamine. The acid portion of the tertiary amine is preferably an organic acid with a $pKa > 3.0$, such as oleic, octanoic, formic, propionic or stearic acid, or phenol.

The present invention is best illustrated by reference to the following examples, which shows the manufacture of the new urethane compositions as well as the unusual results obtained with the above ingredients. All parts and percentages are given by weight.

EXAMPLES

| Ingredient | Parts |
| --- | --- |
| Polyol | 100 |
| Silicone Surfactant | 3 |
| CCl$_3$F | 30 |
| Catalyst | vary |
| Isocyanate | 105 index |
| Butyl benzyl phthalate | vary |

The polyol, surfactant and the blowing agent (CCl$_3$F) are placed in a metal container and drum rolled for several hours while the catalyst is separately mixed with the butyl benzyl phthalate. The polyol mixture is then placed in a cup, the catalyst mixture is added thereto and mixed for 10 seconds before mixing in the isocyanate for 10 seconds (total mixing time=20 seconds). The mixture is then poured into a container and allowed to foam. All times measured start with the addition of the isocyanate.

For rise/rate, the polyol premix is placed in a metal can. The catalyst is added with stirring for 10 seconds, the isocyanate is added as above, while placing the can immediately under a tube to which it is sealed, so that the exact rise can be measured on a uniform basis in the tube. As will be seen, in some instances an additional tin catalyst was also added.

The following tables show the results obtained with specified amounts of catalyst, butyl benzyl phthalate (BBP), dibutyl tin dilaurate (tin), cream time (CT), rise time (RT) and the penetration depth (P.D.). The P.D. is determined by a modification of the Gardner Variable Impact Tester which is ordinarily used to measure impact resistance of coatings. The test used here consists in dropping a 2-pound steel rod from a height of 2 feet onto the foam and is measured by 1/32 of an inch, 20 minutes after the polymer foam had been formed. The catalysts (Cat.) used are codified as follows:

A. Triethylamine
B. N,N-dimethylcyclohexylammonium formate
C. N-methyldicyclohexylammonium formate
D. N-methyldicyclohexylammonium phenolate
E. N,N,N',N'',N''-pentamethyl dipropylene triammonium triformate
F. DBU formate
G. DBU oleate
H. DBU 2-ethylhexanoate
I. N,N-dimethylcyclohexylammonium 2-ethylhexanoate
J. Triethylammonium formate
K. Tributylammonium phenolate
L. N,N,N',N'-tetramethylpropane-1,3-diammonium diformate

TABLE I

| | Effect of BBP on Amines and Salts | | | |
|---|---|---|---|---|
| Catalyst | % | BBP % | CT(sec) | RT(sec) | PD/32" |
| A | 0.15 | 0 | 46 | 98 | 32 |
| | 0.15 | 3.0 | 40 | 80 | 30 |
| B[2] | 0.5 | 0 | 37 | 72 | 14 |
| | 0.5 | 0.5 | 37 | 68 | 11 |
| | 0.5 | 1.0 | 39 | 71 | 11 |
| | 0.5 | 1.5 | 39 | 70 | 11 |
| | 0.5 | 2.0 | 38 | 70 | 10 |
| | 0.5 | 2.5 | 37 | 69 | 9 |
| | 0.5 | 3.0 | 38 | 70 | 9 |
| E[2] | 0.6 | 0 | 31 | 63 | 28 |
| | 0.6 | 3.5 | 30 | 60 | 15 |
| | 0.3 | 0 | 32 | 67 | 29[1] |
| | 0.3 | 3.0 | 31 | 62 | 20[1] |
| G | 0.6 | 0 | 32 | 75 | 26 |
| | 0.6 | 3.0 | 27 | 55 | 17 |
| H | 0.6 | 0 | 20 | 47 | 18 |
| | 0.6 | 3.0 | 20 | 42 | 7 |
| I[2] | 0.6 | 0 | 20 | 48 | 11 |
| | 0.6 | 3.0 | 20 | 52 | 9 |
| J[2] | 0.6 | 0 | 32 | 57 | 8 |
| | 0.6 | 3.0 | 30 | 53 | 5 |
| K[2] | 0.6 | 0 | 18 | 47 | 12 |
| | 0.6 | 3.0 | 18 | 40 | 5 |
| L[2] | 0.5 | 0 | 30 | 57 | 16 |
| | 0.5 | 3.0 | 27 | 50 | 9 |
| | 0.25[1] | 0 | 35 | 74 | 28 |
| | 0.25[1] | 3.0 | 34 | 74 | 29 |

[1]Monoformate
[2]Used as a 50% solution in dipropylene glycol

From the above, it is obvious that, while BBP is effective in reducing friability when a total salt is used as a catalyst, it is either not as effective, or not at all effective, if a free amine or partial salt is used as a catalyst.

TABLE II

| | Effect of Tin | | | | |
|---|---|---|---|---|---|
| Catalyst | % | BBP % | Tin % | CT(sec) | RT(sec) | PD/32" |
| None | — | 3.5 | 0.3 | 50 | 165 | 24 |
| B[2] | 1.2 | 0 | 0.1 | 35 | 54 | 11 |
| | 1.2 | 0.5 | 0.1 | 28 | 50 | 8 |
| | 1.2 | 2.0 | 0.1 | 25 | 52 | 6 |
| | 1.2 | 3.5 | 0.1 | 27 | 54 | 6 |
| C[2] | 1.2 | 3.5 | 0 | 60 | 105 | 16 |
| | 1.2 | 2 | 0.1 | 28 | 74 | 11 |
| | 1.2 | 3.5 | 0.1 | 37 | 73 | 8 |
| D[2] | 1.2 | 3.5 | 0 | 56 | 111 | 18 |
| | 1.2 | 2.0 | 0.1 | 34 | 72 | 10 |
| | 1.2 | 3.5 | 0.1 | 31 | 67 | 7 |
| E[2] | 0.6 | 0 | 0 | 31 | 63 | 28 |
| | 0.6 | 3.5 | 0 | 30 | 60 | 15 |

TABLE II-continued

| | Effect of Tin | | | | |
|---|---|---|---|---|---|
| Catalyst | % | BBP % | Tin % | CT(sec) | RT(sec) | PD/32" |
| | 0.6 | 3.5 | 0.1 | 35 | 87 | 12 |

This table shows that tin alone gives a foam with poor friability, amine salts in combination with tin improve the friability and tin in combination with amine salts and BBP are markedly improved, even over the combination of tin and amine salt alone.

It will be seen from the above examples that regardless of the type of amine used in the tertiary amine salt, and independent of the type of acid used in that salt formation, a vast improvement is obtained in the friability of the polyurethane foam made from the above resole. The table also shows that the addition of a tin catalyst further improves the friability of the foam to some extent and that the addition of butyl benzyl phthalate (experiments G to L) produces a significant difference in friability improvement. Most of all, the table shows (experiment A) that the use of a tertiary amine catalyst, regardless of the presence or absence of butyl benzyl phthalate, produces unacceptable results.

The most significant advance of the present invention therefore is the use of a combination of butyl benzyl phthalate with a full neutralized salt of a tertiary amine for the preparation of polyurethane foams. While this combination of agents has primarily been demonstrated in use with polyurethane foams based on resole, the new combination can also be used for other polyurethane foams, alone or together with a tin catalyst. The butyl benzyl phthalate and the tertiary amine salt are compatible with one another and can be stored together under normal conditions of humidity and temperature for extended periods of time. A particularly useful combination contains the two ingredients in a ratio between 5 and 30 parts by weight of the amine salt in butyl benzyl phthalate. This mixture can furthermore contain an optional tin catalyst, such as dialkyl tin dicarboxylates, dialkyl tin dimercaptides, etc. at a level of between 10 and 50% of the content of said amine salt. An excellent mixture for the above process contains 10 to 30 parts of a tertiary amine salt, 70 to 90 parts of butyl benzyl phthalate and 0 to 10 parts of a tin catalyst. Those skilled in the art are familiar with other types of tin catalysts used in polyurethane reactions; they have been adequately described and defined in the literature, see for instance U.S. Pat. No. 4,086,213 or Polyurethanes: Chemistry and Technology, Part I-Saunders & Frisch, Interscience, 1967 pp. 167–8 and others.

The new composition necessarily contains a major proportion of butyl benzyl phthalate which is a liquid. Where the amine salt is also liquid, the combination of the two materials is easily accomplished. Where the amine salt is a solid, as for instance in the case of dimethylcyclohexylammonium formate, the solid catalyst is simply dissolved first in an organic solvent which is miscible with butyl benzyl phthalate and then combined with the latter. Excellent vehicles for this purpose are the low molecular weight glycols, such as dipropylene glycol or ethylene glycol.

We claim:

1. The process of making a rigid, cellular polyurethane with improved friability, comprising reacting a polyisocyanate with a polyol in the presence of a fully neutralized salt of a tertiary amine, a surfactant, a blowing agent, and at least a minor proportion of butyl benzyl phthalate, said polyol being prepared by reacting a phenol and formaldehyde under substantially anhydrous conditions with continuous removal of water, said polyol having a water content of no more than about 5% and having at least four phenyl groups per mole.

2. The process of claim 1 wherein said tertiary amine salt is present in an amount of between 0.001 and 0.05 molar equivalents based on the amount of said polyol.

3. The process of claim 2 wherein said salt contains as the acid portion an organic acid with a pKa of $>3.0$.

4. The process of claim 1 wherein said tertiary amine is a bicyclic amidine.

5. The process of claim 4 wherein said amidine is 1,5-diaza-bicyclo[5.4.0]-undec-5-ene.

6. The process of claim 1 wherein said tertiary amine is $[Me_2N(CH_2)_3]_3N$.

7. The process of claim 1 wherein said tertiary amine is $[Me_2N(CH_2)_3]_2NMe$.

8. The process of claim 1 wherein said tertiary amine salt is $[Me_2N(CH_2)_3]_2NMe.formate$.

9. The process of claim 1 wherein said tertiary amine salt is $[Me_2N(CH_2)_3]_2NMe$ phenolate.

10. The process of claim 1 wherein an optional tin catalyst is added to the reaction mixture at a level of 10–50 weight percent of said amine salt.

11. The process of making a rigid cellular polyurethane from one molar equivalent of a polyol which is prepared by reacting a phenol and formaldehyde under substantially anhydrous conditions with continuous removal of water and said polyol having a water content of no more than about 5% and having at least four phenyl groups per mole, and 0.95 to 1.25 molar equivalents of a polyisocyanate, in the presence of 0.001–0.05 molar equivalents of a fully neutralized tertiary amine salt, 0.5–5.0% of benzyl butyl phthalate, 0.5–4.0% of a surfactant and 0.4–40% of a blowing agent, said percentage figures being taken as a weight-by-weight amount based on said polyol.

12. The process of claim 11 wherein said tertiary amine salt is present in an amount of between 0.001 and 0.01 molar equivalents based on said polyol.

13. The process of claim 12 wherein said salt contains as the acid portion an organic acid with a pKa of $>3.0$.

14. The process of claim 11 wherein said tertiary amine is a bicyclic amidine.

15. The process of claim 14 wherein said amidine is 1,5-diaza-bicyclo[5.4.0]-undec-5-ene.

16. The process of claim 11 wherein said tertiary amine is $[Me_2N(CH_2)_3]_3N$.

17. The process of claim 11 wherein said tertiary amine is $[Me_2N(CH_2)_3]_2NMe$.

18. The process of claim 11 wherein said tertiary amine salt is $[Me_2N(CH_2)_3]_2NMe$ formate.

19. The process of claim 11 wherein said tertiary amine salt is $[Me_2N(CH_2)_3]_2NMe$ phenolate.

20. The process of claim 11 wherein an optional tin catalyst is added to the reaction mixture at a level of 10–50 weight percent of said amine salt.

21. A composition for use in the manufacture of cellular, rigid polyurethane foams containing 10–30 parts of a tertiary amine salt wherein for each tertiary amine site there is a molar equivalent of an organic acid present with a pKa$>3.0$, 90–70 parts of butyl benzyl phthalate and 0–10 parts of a tin catalyst.

* * * * *